US010126055B2

United States Patent
Boeberl et al.

(10) Patent No.: US 10,126,055 B2
(45) Date of Patent: Nov. 13, 2018

(54) SUPPLY CHUTE FOR SINTER MATERIAL (71) Applicant: PRIMETALS TECHNOLOGIES AUSTRIA GMBH, Linz (AT)

(72) Inventors: Michaela Boeberl, St. Florian (AT); Edmund Fehringer, Aschbach Markt (AD); Stephan Hattinger, Leonding (AT); Stefan List, Linz (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 339 days.

(21) Appl. No.: 14/772,824

(22) PCT Filed: Feb. 24, 2014

(86) PCT No.: PCT/EP2014/053500
§ 371 (c)(1),
(2) Date: Sep. 4, 2015

(87) PCT Pub. No.: WO2014/135386
PCT Pub. Date: Sep. 12, 2014

(65) Prior Publication Data
US 2016/0010921 A1    Jan. 14, 2016

(30) Foreign Application Priority Data

Mar. 4, 2013 (EP) .................................. 13157628

(51) Int. Cl.
*F27D 3/00* (2006.01)
*C22B 1/26* (2006.01)
(Continued)

(52) U.S. Cl.
CPC .............. *F27D 3/00* (2013.01); *B65G 11/083* (2013.01); *B65G 11/088* (2013.01); *B65G 37/00* (2013.01);
(Continued)

(58) Field of Classification Search
CPC ............. F27D 3/00; F27D 15/02; F27B 21/06
See application file for complete search history.

(56) References Cited

U.S. PATENT DOCUMENTS 2,031,049 A * 2/1936 Lee ......................... F27B 7/383
34/432
3,063,647 A * 11/1962 Lellep ................. F27D 15/0286
241/17
(Continued)

FOREIGN PATENT DOCUMENTS

CN    101050921    10/2007
CN    201158688    12/2008
(Continued)

OTHER PUBLICATIONS

EP0302539A1—machien translation.*
(Continued)

*Primary Examiner* — Nathaniel Herzfeld
(74) *Attorney, Agent, or Firm* — Ostrolenk Faber LLP (57) ABSTRACT A supply chute, and a system and a method for supplying sinter material from a sinter belt to a sinter cooler (26). A flow of the sinter material (16) is input into the supply chute (1). The flow of sinter material (16) after being input is concentrated by a device in the chute. This means that the flow is remixed for more uniform grain size distribution. The flow is thereafter widened by a widening device in the chute. Then the widened flow of sinter material (16), optionally after making the movement direction of the flow of sinter material (16) uniform, the flow is passed through a segregation device (8,25) and is there segregated, which means that a grain size distribution across the thickness and across the width of the flow is made more uniform. This occurs after the widened flow of sinter material moves in the direction of the output region (5). After passing through the output region (5), the flow of sinter material (16) is supplied
(Continued)

to the sinter cooler (26), wherein the horizontal main component B of the movement direction of the flow of sinter material is largely perpendicular to the horizontal main component A of the movement of sinter material by the sinter belt.

20 Claims, 5 Drawing Sheets (51) Int. Cl.
| | | |
|---|---|---|
| *F27B 21/06* | (2006.01) | |
| *F27D 3/10* | (2006.01) | |
| *F27D 15/02* | (2006.01) | |
| *B65G 11/08* | (2006.01) | |
| *B65G 37/00* | (2006.01) | |

(52) U.S. Cl.
CPC ............... *C22B 1/26* (2013.01); *F27B 21/06* (2013.01); *F27D 3/0033* (2013.01); *F27D 3/10* (2013.01); *F27D 15/02* (2013.01); *F27D 15/0286* (2013.01)

(56) References Cited

U.S. PATENT DOCUMENTS

| | | | | |
|---|---|---|---|---|
| 3,172,648 | A * | 3/1965 | Brichard | ............... C03B 3/023 |
| | | | | 432/101 |
| 3,780,890 | A * | 12/1973 | Glover | .................. C21B 7/18 |
| | | | | 193/31 R |
| 4,469,216 | A * | 9/1984 | Haataja | ................. B27N 3/143 |
| | | | | 198/382 |
| 4,648,900 | A * | 3/1987 | Bostrom | .................... B01J 2/22 |
| | | | | 75/769 |
| 6,973,843 | B2 * | 12/2005 | Shyy | ......................... G01F 1/30 |
| | | | | 73/861.73 |
| 7,604,447 | B2 * | 10/2009 | Cimenti | ............ B65G 69/0441 |
| | | | | 414/299 |
| 7,811,086 | B2 | 10/2010 | Laaber et al. | |
| 8,876,526 | B2 | 11/2014 | Auberger et al. | |
| 2008/0108006 | A1 | 5/2008 | Laaber et al. | |
| 2012/0225394 | A1 | 9/2012 | Auberger et al. | ................. 432/1 |

FOREIGN PATENT DOCUMENTS

| | | | |
|---|---|---|---|
| CN | 102472583 A | | 5/2012 |
| CN | 202432858 U | | 9/2012 |
| CN | 202485456 U | | 10/2012 |
| DE | 1218344 | | 6/1966 |
| DE | 37 26 271 A1 | | 2/1989 |
| EP | 0 302 539 A1 | | 2/1989 |
| JP | S62 129687 | | 6/1987 |
| JP | 64-48714 A | | 2/1989 |
| JP | 05139799 A | * | 6/1993 |
| JP | 2013-503316 | | 1/2013 |
| KR | 20120061332 | | 6/2012 |
| RU | 2 142 105 C1 | | 11/1999 |
| WO | WO 98/52850 A1 | | 11/1998 |
| WO | WO 2006/015680 | | 2/2006 |
| WO | WO 2011/023621 A1 | | 3/2011 |

OTHER PUBLICATIONS

First Office Action dated Apr. 22, 2016 in corresponding Chinese Patent Application No. 201480012143.2 with Search Report (English language translation)(18 total pages).
International Search Report dated Aug. 26, 2014 issued in corresponding International patent application No. PCT/EP2014/053500.
Written Opinion dated Aug. 26, 2014 issued in corresponding International patent application No. PCT/EP2014/053500.
European Search Report dated Aug. 14, 2013 issued in corresponding European patent application No. 13 15 7628.
International Preliminary Report on Patentability issued in corresponding International patent application No. PCT/EP2014/053500.
Office Action dated Sep. 5, 2016 issued in corresponding Japanese Patent Application No. 2015-560611.
Office Action dated Dec. 19, 2016 issued in corresponding Russian Patent Application No. 2015142095/02 (064951) without English translation.

\* cited by examiner

SUPPLY CHUTE FOR SINTER MATERIAL

CROSS-REFERENCE TO RELATED APPLICATIONS

The present application is a 35 U.S.C. §§ 371 national phase conversion of PCT/EP2014/053500, filed Feb. 24, 2014, which claims priority of European Patent Application No. 13157628.2, filed Mar. 4, 2013, the contents of which are incorporated by reference herein. The PCT International Application was published in the German language.

FIELD OF THE INVENTION

The invention relates to a supply chute for supplying sinter material onto a sinter cooler, and to a method for supplying sinter material from a sinter belt onto a sinter cooler.

PRIOR ART

In order to cool a hot granular sinter material produced in a sinter plant, the sinter material is supplied onto a moving sinter cooler. Here cooling is performed by a mechanically produced air flow, which is guided from below through the hot granular sinter material deposited on the cooling bed of the sinter cooler. The efficiency of the cooling is affected by the grain-size distribution of the granular sinter material on the cooling bed, because the grain-size distribution determines the resistance to the air flow. A resistance that varies in strength in different regions of the sinter material results in a low or non-existent air flow through regions of high resistance, and hence the sinter material is not cooled evenly. Uneven cooling causes different grains of the sinter material discharged from the sinter cooler to have different temperatures. Grains at temperatures above a desired discharge temperature can cause damage to subsequent equipment processing the cooled sinter material, such as conveyor belts and screening equipment for instance.

The horizontal and vertical grain-size distribution in the sinter material on the cooling bed of the sinter cooler is affected by the supply chute used to supply the crushed sinter material from the sinter belt onto the sinter cooler.

A conventional supply chute comprises a shaft which is bounded by side walls and has an upper input region for the input of the granular sinter material to be cooled, and a lower output region, through which the granular sinter material to be cooled is supplied onto the cooling bed of the sinter cooler.

The shaft is here designed and arranged such that the input region lies higher than the output region, with the sinter material moving from the input region to the output region under the effect of gravity. The output region is here located between side walls of the shaft and a downwards-sloping base plate of the supply chute.

In known supply chutes, a downwards-sloping input guide plate extends inside the shaft in the input region and is used to impart a downwards-inclined sliding movement to the granular material input to the shaft. A gap is left between the input guide plate and side walls of the supply chute, through which gap the sinter material can move towards the output region as a result of gravity. Below this gap, a downwards-sloping deflector plate is arranged in the shaft. Since the deflector plate has a different direction of incline from the input guide plate, the deflector plate imparts to the flow of sinter material flowing through the supply chute a sliding movement in a different direction. A gap is left between the deflector plate and the side wall of the shaft of the supply chute opposite the lower end of the deflector plate, through which gap the sinter material can move towards the output region as a result of gravity. The base plate, which has a different direction of incline from that of the deflector plate, is usually arranged below this gap. It is known that the total flow of sinter material leaving the supply chute through the output region has a grain-size distribution gradient that extends across the thickness of the output flow of sinter material as a result of segregation effects on the sinter material added to the supply chute that take place during the passage through the supply chute. This gradient can be exploited by loading a moving cooling bed of the sinter cooler, which bed is located under the output region, such that the grain size of the sinter material in the layer on the cooling bed viewed across the width of the cooling bed primarily reduces from bottom to top, i.e. a gradient in the grain-size distribution exists across the thickness of the layer. A reduction in the grain size from bottom to top facilitates efficient cooling because a cooling air flow supplied from below thereby encounters little resistance on entering the layer. In addition, more heat is stored in the particles of the sinter material that have a larger grain size than in particles of the sinter material of smaller grain size, and so initial contact of the cooling airflow with particles of larger grain size results in more efficient cooling.

The disadvantage with conventional plants, however, is that the gradient of the grain-size distribution is very uneven across the full width of the moving cooling bed or does not exist in parts particularly when the sinter belt moves largely at right angles to the direction of movement of the sinter cooler in the output region. This is because coarser-grained and hence heavier particles of the sinter material have a higher kinetic energy in the direction of movement of the sinter belt than smaller particles and hit the input guide plate at a correspondingly further distance from the sinter belt. The coarser-grained material arrives in the supply chute in a correspondingly greater concentration in the region of the corresponding edge of the total flow of sinter material. In many conventional sinter chutes, this inhomogeneous distribution still exists on the cooling bed of the sinter cooler, and therefore uniform cooling of the sinter material by the cooling air flow is not guaranteed because the resistance presented by the sinter material to the air flow varies across the width of the cooling bed.

In order to facilitate a beneficial distribution, WO 2006/015680A1 discloses a supply apparatus for a belt sinter machine, which is equipped with two separate discharge apertures for supplying material to be sintered to a sinter belt. In this apparatus, the material fed into the supply apparatus is separated into a coarse component and a fine component and supplied to the sinter belt by the two separate discharge apertures in such a way that the fine component of the material comes to rest above the coarse component of the material.

WO 1998/052850A1 discloses an apparatus for variable division of the material flow into different-sized subflows of material by means of rotatable deflectors. No measures whatsoever are provided in this apparatus for affecting the grain-size distribution of the material flows.

WO2011/023621A1 proposes splitting the flow of sinter material, at input, into two sinter-material subflows that have different directions and are subsequently recombined. Owing to structural circumstances, particularly in existing plants with a fixed amount of space, it is not always possible to install a supply chute of this type.

SUMMARY OF THE INVENTION

Technical Problem

The object of the present invention is to provide a further method for supplying sinter material from a sinter belt onto a sinter cooler by means of a supply chute, and to provide a supply chute, which method and supply chute can be used to achieve uniformity in the grain-size distribution of sinter material across the width on the cooling bed of a sinter cooler.

Technical Solution

This object is achieved by

A method for supplying sinter material from a sinter belt onto a sinter cooler by means of a supply chute, wherein a flow of sinter material in an input region is input to the supply chute, said sinter material being moved by the sinter belt towards the input region of the supply chute, wherein the movement of the sinter material by the sinter belt has a direction of movement having a main horizontal component A, and the sinter material moves under the effect of gravity from the input region towards an output region of the supply chute, and after being input, the flow of sinter material is concentrated by a concentrating device and subsequently widened by a widening device, and then the widened flow of sinter material, if applicable after passing through a device for aligning the direction of movement of the flow of sinter material, passes through a segregation device and is segregated as it moves towards the output region, and the flow of sinter material on passing through the output region of the supply chute has a direction of movement having a main horizontal component B, and after passing through the output region, the flow of sinter material is supplied onto the sinter cooler, characterized in that the main horizontal component B is substantially orthogonal to the main horizontal component A.

When supplying sinter material from a sinter belt onto a sinter cooler, there may be additional devices present between sinter belt and supply chute, through which devices the sinter material passes before entering the supply chute. Examples of such devices are crushers, vibrating feeders, plate-link conveyors and screening equipment for the purpose of conveying and/or sorting by size the sinter material. Thus the sinter material can be input to the supply chute directly or indirectly from the sinter belt.

Sinter material is delivered from a sinter belt to the supply chute. A flow of sinter material leaves the sinter belt and is input, if applicable after a crushing process, to an input region of the supply chute. The flow of sinter material moves under the effect of gravity from the input region towards an output region of the supply chute, because the input region lies higher than the output region. According to the invention, after being input, the flow of sinter material is concentrated by a concentrating device.

Advantageous Effects of the Invention

This has the effect of recombining, in other words re-mixing, different-sized particles of the sinter material which have separated out from one another, i.e. have become segregated, between leaving the sinter belt and being input to the supply chute, or more precisely arriving at the concentrating device. Hence uneven distributions of particles of different grain size, in other words segregation effects, experienced by the flow of sinter material before passing through the concentrating device, are largely reversed and can therefore have scarcely any effect on the grain-size distribution on the sinter cooler.

After concentration, i.e. after the flow of sinter material has been concentrated by the concentrating device, the flow of sinter material is widened by a widening device. This is done so that when it passes through the output region, it has a necessary width for being supplied to the sinter cooler.

After widening, i.e. after the flow of sinter material has been widened by the widening device, the flow of sinter material passes through a segregation device. When passing through the segregation device, the flow moves towards the output region. As it moves, it is segregated, and specifically in such a way that after it has passed through, it has a grain-size distribution gradient extending across the thickness of the flow, i.e. from top to bottom or from bottom to top, of the sinter material, that preferably is substantially uniform across the width of the flow of sinter material when passing through the output region.

If applicable, the widened flow of sinter material passes through a device for aligning the direction of movement of the flow of sinter material before it passes through the segregation device.

The movement of the flow of sinter material can be represented by a resultant vector obtained by the addition of vectors corresponding to the three coordinate axes in a three-dimensional orthogonal coordinate system, of which vectors two lie in a horizontal plane and one lies perpendicular to this plane. Of the vectors that correspond to the three coordinate axes and lie in the horizontal plane, that vector that has the larger magnitude is denoted as the main horizontal component of movement or of the direction of movement.

The particles of the sinter material leave the concentrating device with directions of movement that have different main horizontal components because the previously concentrated flow is of course widened.

The main horizontal components of the directions of movement are advantageously aligned before the flow of sinter material passes through the segregation device. This is done in the device for aligning the direction of movement of the flow of sinter material. Alignment of the main horizontal components of the direction of movement is understood to mean that the main horizontal components of the directions of movement of the particles of the flow of sinter material have a substantially parallel alignment after passing through the alignment device If a flow of sinter material composed of particles for which the main horizontal components of their directions of movement have been aligned in such a way passes through the segregation device, the segregation effect achievable there is especially strong.

After passing through the output region, the flow of sinter material is supplied onto the sinter cooler.

In the method according to the invention, the sinter material is moved from the sinter belt towards the input region of the supply chute, wherein the movement of the sinter material by the sinter belt has a direction of movement having a main horizontal component A, and the flow of sinter material on passing through the output region of the supply chute has a direction of movement having a main horizontal component B.

The method according to the invention is characterized in that the main horizontal component B is substantially orthogonal to the main horizontal component A.

Thus the sinter belt, at least at its end where the sinter material is discharged, i.e. is input to the supply chute, moves substantially orthogonal to the direction of movement of the sinter cooler in the output region, or more precisely specifically below the output region.

The sinter cooler may run in a straight line or may be a circular cooler, for instance. In the case of a circular cooler, the direction of movement of the sinter cooler, i.e. the direction in which the sinter material to be cooled is moved by the sinter cooler, obviously changes continuously. What is important, however, is the direction of movement of the sinter cooler below the output region.

The movement of the sinter material moved by the sinter belt, i.e. of the flow of sinter material, can be represented by a resultant vector obtained by the addition of vectors corresponding to the three coordinate axes in a three-dimensional orthogonal coordinate system, of which two vectors lie in a horizontal plane and one lies perpendicular to this plane. Of the vectors that correspond to the three coordinate axes and lie in the horizontal plane, that vector that has the larger magnitude is denoted as the main horizontal component of movement. The direction of this vector is the main horizontal component of the sinter material or flow of sinter material moved by the sinter belt.

By performing the method according to the invention, the sinter material can be supplied from a sinter belt, which is moving substantially orthogonal to the direction of movement of the sinter cooler in the output region, onto the sinter cooler such that it has a direction of movement that largely corresponds to the direction of movement of the sinter cooler in the output region.

Substantially orthogonal is understood to mean here an angle range of greater than 45° or less than 135°, preferably 90+/−10°, and preferably 90+/−5°.

Such a change in the direction of movement of the flow of sinter material can be effected by means of the concentrating by the concentrating device and/or the widening by the widening device and/or by means of the segregation device.

If in the supply of sinter material from a sinter belt onto a sinter cooler, additional devices are present between sinter belt and supply chute, through which devices the sinter material passes before entering the supply chute, experiencing a change in the main horizontal component of its direction of movement, then in the method according to the invention it is preferred that the main horizontal component B is substantially orthogonal to the main horizontal component of the direction of the movement of the sinter material entering the supply chute.

One embodiment of the present application is a method which is characterized in that between input region and output region of the supply chute, the main horizontal component of the direction of movement of the flow of sinter material changes at least when the flow is concentrated by the concentrating device and/or when it is widened by the widening device.

A further embodiment of the present application is a method that is characterized in that the main horizontal component of the flow of the sinter material changes on passing through the segregation device.

Passing through is understood to mean here from the arrival of the widened flow of sinter material at the segregation device, or the entry of the widened flow into the segregation device, up to the passage through the output region.

A further subject of the present application is
a system for implementing a method according to the invention, comprising
sinter material
and
a supply chute
comprising
a shaft having input region and output region,
wherein in the shaft of the supply chute are located
a concentrating device for concentrating a flow of sinter material,
a spreading device for spreading a flow of sinter material,
if applicable, a device for aligning the direction of movement of the flow of sinter material,
a segregation device for segregating a flow of sinter material,
wherein the concentrating device is formed by
a first support in the shaft of the supply chute
and
a cushion of sinter material lying on this first support,
and/or
wherein the widening device is formed by
a second support in the shaft of the supply chute
and
a cushion of sinter material lying on this second support.

A flow of sinter material can be concentrated by means of the sinter material flowing over a surface that steers its movement towards a region of space. This surface can be formed by a cushion of sinter material lying on a support in the shaft of the supply chute.

The same applies analogously to the widening of a flow of sinter material; again in this case, the surface having a steering action can be formed by a cushion of sinter material lying on a corresponding support in the shaft of the supply chute.

In principle, the concentrating device can also be formed by a plurality of supports, referred to as first supports, on which lie one or more cushions of sinter material.

In principle, the widening device can also be formed by a plurality of supports, referred to as second supports, on which lie one or more cushions of sinter material.

In order that the system is suitable for implementing the method according to the invention, viewed from the input region towards the output region, the widening device lies after the concentrating device, and the segregation device lies after the widening device. Viewed in this direction, the device that may be present for aligning the direction of movement of the flow of sinter material lies after the widening device and before the segregation device.

The method according to the invention can be implemented using such a system comprising sinter material and supply chute.

Such embodiments of the present invention have the advantage that the flow of sinter material flows over a cushion of sinter material, avoiding any wear to parts of the supply chute.

The surface over which sinter material flows for the purpose of concentration or widening need not be formed from a cushion of sinter material lying on a support in the shaft of the supply chute, as in the previously described system. It can also be formed from parts of the supply chute.

The system preferably comprises a sinter belt and a sinter cooler, and is characterized in that the longitudinal direction of the sinter belt lies substantially orthogonal to the direction of movement of the sinter cooler below the output region.

The longitudinal direction is understood to mean the longitudinal direction at the end of the sinter belt where the sinter material is discharged, i.e. input to the supply chute, and which defines the main horizontal component A of the sinter material. Ultimately, the crucial element is the main horizontal component A of the sinter material, which must lie orthogonal to the direction of movement of the sinter cooler below the output region.

The sinter cooler is arranged below the output region. The sinter material is supplied onto the cooler and then carried away from the output region by the cooler by movement of the sinter cooler.

A further subject of the present application is a supply chute for implementing a method according to the invention, comprising
  a shaft having input region and output region and bounded by a plurality of side walls, and in the shaft
    a concentrating device for concentrating a flow of sinter material,
    a widening device for widening a flow of sinter material,
    if applicable, a device for aligning the direction of movement of the flow of sinter material,
    a segregation device for segregating a flow of sinter material.

In order that the supply chute is suitable for implementing the method according to the invention, viewed from the input region towards the output region, the widening device lies after the concentrating device, and the segregation device lies after the widening device. Viewed in this direction, the device that may be present for aligning the direction of movement of the flow of sinter material lies after the widening device and before the segregation device.

The shaft of the supply chute is bounded by side walls and has an input region at the top and an output region at the bottom. The sinter material is input via the input region, and output via the output region.

According to a preferred embodiment of the supply chute according to the invention, the shaft of the supply chute is formed from at least two chute modules, arranged one above the other for a vertical orientation of the shaft, at least the higher-lying chute module of which chute modules is moveable.

Hence, for instance for maintenance purposes, the top chute module, or equipment located in front of this module, can be moved to one side, making the bottom chute module more easily accessible.

According to a preferred embodiment of the supply chute according to the invention, the widening device is formed from at least two modules, arranged one above the other for a vertical orientation of the shaft, wherein the higher-lying module is connected to the higher-lying chute module and can be moved jointly with same.

The two modules are not connected to one another so that the top module can be moved together with the top chute module.

According to a preferred embodiment, the top module has on its lower edge an edge barrier suitable for supporting a cushion of sinter material.

This can prevent sinter material that is lying on the top module from sliding off when the top module is moved and causing damage to lower-lying plant parts.

According to one embodiment, the concentrating device for concentrating a flow of sinter material is formed from one or more components which extend from one or more side walls of the shaft into the inside of the shaft,
  wherein at least a portion of the concentrating-device surface facing the input region has a slope that is greater than the angle of repose of the sinter material, preferably is greater than or equal to 36° degrees. The angle is defined with respect to the horizontal, where the surface slopes downwards from the side wall of the shaft.

According to another embodiment, the widening device for widening a flow of sinter material is formed from one or more components which extend from one or more side walls of the shaft into the inside of the shaft,
  wherein at least a portion of the widening-device surface facing the input region has a slope that is greater than the angle of repose of the sinter material, preferably is greater than or equal to 36° degrees. The angle is defined with respect to the horizontal, where the surface slopes downwards from the side wall of the shaft.

In such embodiments of the supply chute according to the invention, a cushion of sinter material cannot build up on the concentrating device and/or widening device, with the result that the surfaces over which sinter material flows for the purpose of concentration or widening, are not formed by a cushion of sinter material as in the previously described system but by parts of the supply chute.

The device that may be present for aligning the direction of movement of the flow of sinter material, viewed in the direction from the input region to the output region, lies after the widening device and before the segregation device.

A further subject of the present application is a supply chute for implementing a method according to the invention in a system according to the invention,
  comprising
  a shaft having input region and output region and bounded by a plurality of side walls,
    wherein in the shaft of the supply chute are located
    the first support for supporting a cushion of sinter material lying thereon,
    and/or
    the second support for supporting a cushion of sinter material lying thereon,
    and
    a segregation device for segregating a flow of sinter material,
    and, if applicable, a device for aligning the direction of movement of the flow of sinter material.

The cushions of sinter material present in the system according to the invention can be formed on the supports of such a supply chute.

According to one embodiment, the segregation device is a downwards-sloping base plate, wherein the output region of the supply chute lies between the lower end of the base plate and the lower end of at least one side wall.

Such a segregation device is easy to manufacture. Segregation in the sense of forming a gradient in the grain-size distribution across the thickness of the flow of sinter material takes place during the gravity-induced movement of the sinter material towards the output region.

According to a preferred embodiment, the first support is formed from one or more components which extend from one or more side walls of the shaft into the inside of the shaft, wherein at least a portion of the surface of the first support facing the input region has a slope that is less than the angle of repose of the sinter material, preferably is less than 36° degrees. The angle is defined with respect to the horizontal, where the surface slopes downwards from the side wall of the shaft.

According to a preferred embodiment, the second support is formed from one or more components which extend from one or more side walls of the shaft into the inside of the shaft, wherein at least a portion of the surface of the second support facing towards the input region has a slope that is less than the angle of repose of the sinter material, preferably is less than 36° degrees.

The angle is defined with respect to the horizontal, where the surface slopes downwards from the side wall of the shaft.

The first and/or second support preferably has at least one edge barrier for stabilizing the cushion of sinter material lying thereon.

The cushion is thereby secured against sliding off, hence reducing the risk that parts of the supply chute are exposed to wear if the cushion slides off and parts of the supply chute are exposed.

According to one embodiment, the device for aligning the direction of movement of the flow of sinter material, in a supply chute according to the invention for implementing a method according to the invention, or in a supply chute according to the invention implementing a method according to the invention in a system according to the invention, is a downwards-sloping plate. This plate slopes downwards such that the higher-lying end is adjacent to the widening device, and the lower-lying end is adjacent to the segregation device. Sinter material from a widened flow of sinter material is hence moved under gravity towards the segregation device.

Such a device for aligning the direction of movement of the flow of sinter material is easy to manufacture.

In addition it has the advantage that segregation in the sense of forming a gradient in the grain-size distribution across the thickness of the flow of sinter material also already takes place on this device during the gravity-induced movement of the sinter material.

BRIEF DESCRIPTION OF THE DRAWINGS

The present invention is described below by way of example with reference to schematic diagrams of embodiments.

DESCRIPTION OF THE EMBODIMENTS AND EXAMPLES

Figure 1:
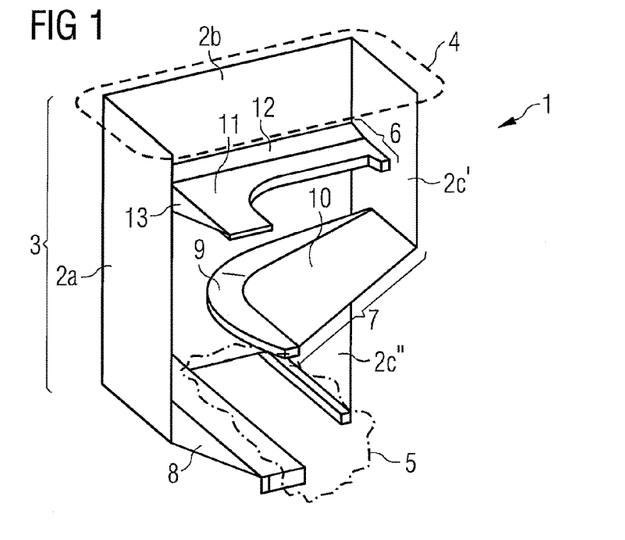
FIG. 1 shows a supply chute according to the invention for implementing a method according to the invention.

FIG. 1 shows a view of a supply chute according to the invention for implementing a method according to the invention in a system according to the invention, in which supply chute the side wall of the supply chute facing the viewer is not shown for greater clarity. This allows a view inside the supply chute.

The supply chute 1 comprises a shaft 3 bounded by a plurality of side walls 2a,2b,2c',2c" including the hypothetical here open side for viewing inside. The shaft 3 has an input region 4 at the top of the shaft, outlined by a dashed line, and an output region 5 at the bottom of the shaft, outlined by a zigzag line. In the shaft 3 is a first upper support 6 for supporting a cushion of sinter material lying thereon. In the shaft 3 is a second lower support 7 also for supporting a cushion of sinter material lying thereon, as explained below.

In addition, in the shaft 3 is a segregation device 8 for segregating a flow of the sinter material. This device is a downwards-sloping base plate. Fine-grained material accumulates at the bottom of the plate, while coarse-grained material accumulates at the top. The output region 5 of the supply chute lies between the lower end of this base plate 8 and the side walls 2c" and 2b and the side wall that is not shown for greater clarity. The first support 6 is formed from a component which, in the diagram of FIG. 1, extends into the inside of the shaft 3 from the side walls 2a, 2b, 2c' and from the side wall that is not shown for greater clarity. The second support 7 is formed from a component which, in the diagram of FIG. 1, extends into the inside of the shaft 3 from the side wall 2c' and from the side wall that is not shown.

The supports extend into the inside of the shaft such that a gap is left between the supports and at least one of the side walls here 2a, through which gap the sinter material can move downwards towards the output region.

The surfaces of the first support and of the second support that face the input region have a slope which is less than the angle of repose of the sinter material that is used by the supply chute 1 shown to form a system according to the invention. A too steep slope will not retain a cushion of sinter material on a support. Portions of the surfaces have different slopes. For example, the portion 9 of the end of the second support protruding into the inside of the shaft is horizontal, whereas the portion 10 is not horizontal but slopes downwards from the side wall 2c'. The region 11 of the first support 6 is likewise horizontal, whereas the regions 12 and 13 slope downwards from the walls 2a and walls 2b and 2c' respectively. Edge barriers are provided on the first support 6 and on the second support 7 at the edges inside the shaft 3, i.e. at the edges of the regions 11 and 9, for the purpose of stabilizing cushions of sinter material lying thereon, although this is not additionally shown for greater clarity.

Figure 2:
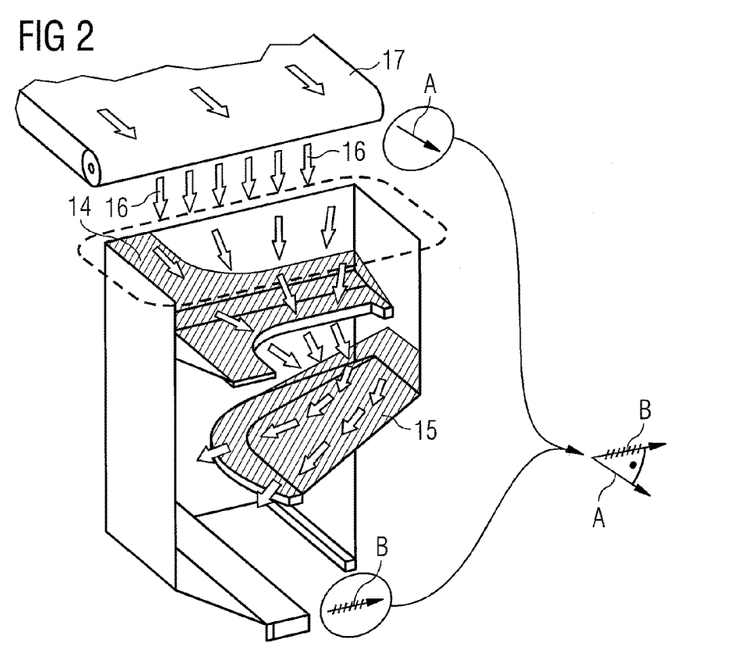
FIG. 2 shows a view that largely corresponds to that of FIG. 1, additionally showing cushions of sinter material.

If cushions of sinter material are lying on the first support 6 and on the second support 7 of the supply chute 1 shown in FIG. 1, then a system according to the invention as shown in FIG. 2 exists. FIG. 2 largely corresponds to FIG. 1 with the main difference being the addition of cushions of sinter material in the supply chute. Those reference signs already shown in FIG. 1 have been omitted for reasons of clarity. A cushion 14 of sinter material is shown on the first support, and a cushion 15 of sinter material is shown on the second support. A flow of sinter material input to the input region, in the system according to the invention slides over the surface of the cushion 14 and is thereby concentrated, that is the first support and the cushion of sinter material lying thereon hence act as a concentrating device.

The concentrated flow of sinter material is steered towards the second support. It hits the cushion 15 of sinter material and slides downwards over the surface thereof, and the flow is widened in the process. The second support and the cushion of sinter material lying thereon hence act as a widening device.

FIG. 2 diagrammatically shows the concentrating and widening of a flow of sinter material, which flow is depicted by wide arrows 16. The flow of sinter material moves from the input region towards the output region due to gravity.

The subsequent passage of sinter material through the segregation device is not shown for reasons of clarity, although the main horizontal component B of the direction of movement of the flow of sinter material on passing through the output region is shown.

FIG. 2 likewise shows the main horizontal component A of the direction of movement of the sinter material moved by the sinter belt 17 at the top towards the input region beyond the outlet end of the run of the belt. The main horizontal component A and the main horizontal component B are orthogonal to one another.

In FIG. 2, the arrows 16 show that between input region and output region of the supply chute, the direction of movement, and its main horizontal component, of the flow of sinter material changes when the flow of sinter material is concentrated by the concentrating device and when it is widened by the widening device. It is also clear from that the main horizontal component of the direction of movement of the flow of sinter material changes on passing through the segregation device, with the result that the main horizontal component B exists on passing through the output region.

Figure 3:
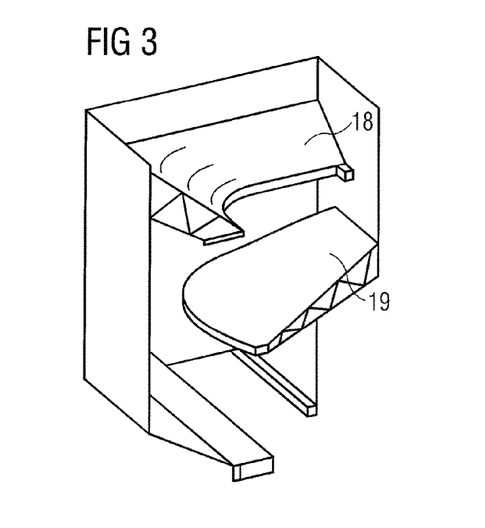
FIG. 3 shows a supply chute according to the invention comprising a concentrating device and a widening device formed from components protruding into the shaft of the supply chute.

FIG. 3 shows a supply chute according to the invention for implementing a method according to the invention. FIG. 3 largely corresponds to FIG. 2 and FIG. 1. Reference signs and discussion relation to identical part(s) in these Figures are omitted for reasons of clarity. Unlike the system shown in FIG. 2, in the system of FIG. 3, there is no a concentrating device formed from support and cushion of sinter material and no widening device formed from support and cushion of sinter material.

Instead, a component 18 extends inside of the shaft. Its surface which faces up towards the input region has a slope that has a gradient of 45° and hence that surface is at an angle greater than the angle of repose of the sinter material to be input to the shaft. This component 18 forms the concentrating device for concentrating a flow of sinter material.

Another component 19 extends into the inside of the shaft. The surface of that component that faces up toward the input region has a slope with a gradient of 45° and hence its slope angle is greater than the angle of repose of sinter material to be input to the shaft. The component 19 forms the widening device for widening a flow of sinter material. The effect of these components 18 and 19 on an input flow of sinter material is similar to the effect of the surfaces of the cushions of sinter material 14 and 15 as discussed with reference to FIG. 2.

If the surfaces of the components 18 and 19 were each to have a slope that is less than the angle of repose of the sinter material to be input to the shaft, cushions of sinter material would form on these surfaces. Hence input sinter material would flow over these cushions in a similar way to that shown in FIG. 2. The components 18 and 19 would then correspond to the first support and the second support.

Figure 4:
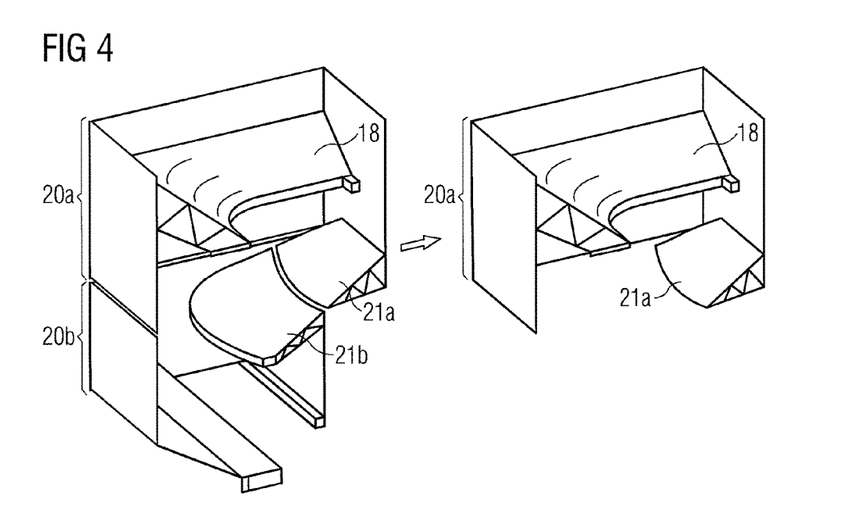
FIGS. 4 and 5 show embodiments comprising moveable chute modules.

FIG. 4 shows how the shaft of a supply chute, which otherwise corresponds to that shown in FIG. 3, is formed from two chute modules 20a and 20b arranged one above the other. The higher-lying chute module 20a can be moved laterally. The widening device likewise has two modules 21a and 21b arranged one above the other. The higher-lying module 21a is connected to the higher-lying chute module 20a and can be moved laterally jointly with chute module 21a. An arrow indicates the ability of the chute module 20a to move jointly with module 21a.

Figure 5:
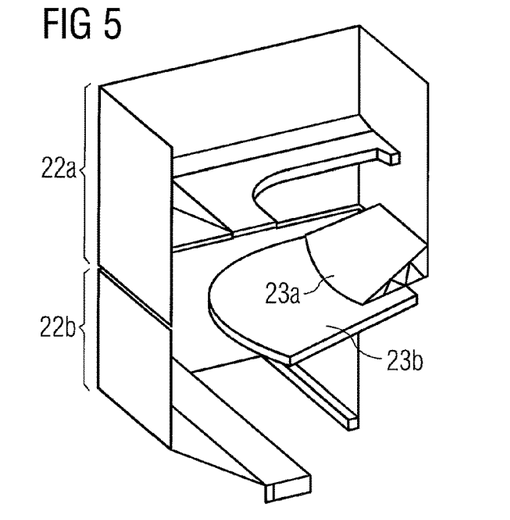

FIG. 5 shows a similar variant of a supply chute for implementing the method according to the invention in a system according to the invention. The Figure largely corresponds to FIG. 1. The shaft of the supply chute is formed from two chute modules 22a and 22b arranged one above the other. The higher-lying chute module 22a can be moved laterally, in a similar way to chute module 20a in FIG. 4; FIG. 5 does not depict this ability to move for reasons of clarity. The widening device likewise has two modules 23a and 23b arranged one above the other. The higher-lying module 23a is connected to the higher-lying chute module 22a and can be moved jointly with the latter.

While the chute is operating, the modules 23a and 23b of the widening device would be covered by a cushion of sinter material, the surfaces of which would have a widening effect as described in connection with FIG. 2.

Module 23a has on its lower edge an edge barrier, which supports the cushion of sinter material lying on that module. This edge barrier is not additionally shown for reasons of clarity. This can prevent this cushion of sinter material from sliding off the module 23a during lateral movement of the chute module 22a.

Figure 6:
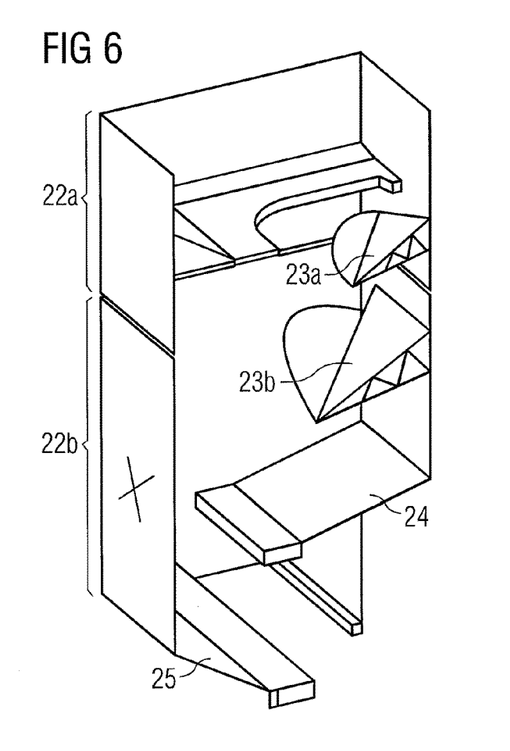
FIGS. 6 and 7 show views of embodiments comprising a device for aligning the direction of movement of the flow of sinter material.
Figure 7:
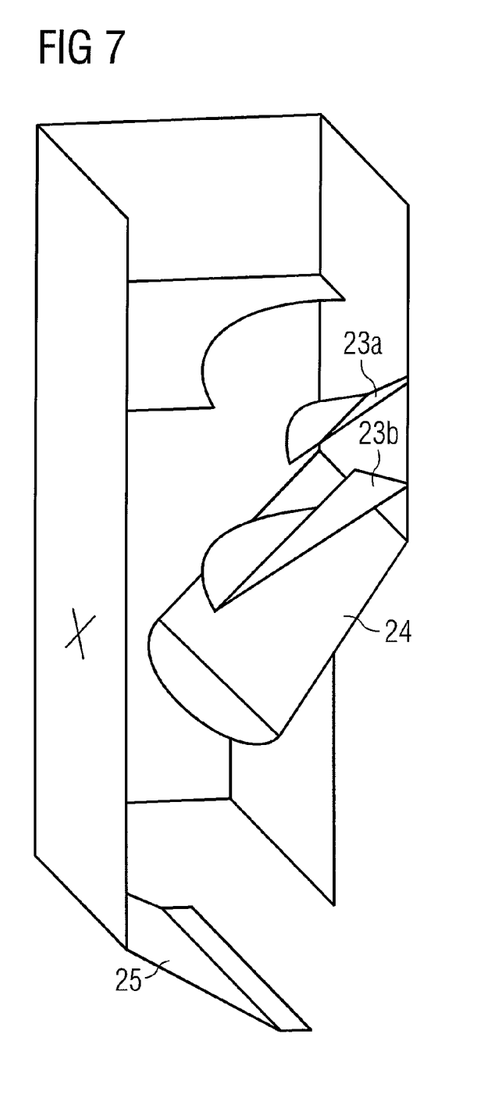

FIGS. 6 and 7 show views of embodiments comprising a device for aligning the direction of movement of the flow of sinter material.

The view in FIG. 6 largely corresponds to FIG. 5. However, they differ in that the modules 23a and 23b of the widening device are shaped differently from those in FIG. 5. In addition, inside the shaft there is also a device 24 for aligning the direction of movement of the flow of sinter material. Viewed from the input region towards the output region, the device 24 lies after the widening device formed from the modules 23a and 23b and before the segregation device 25.

A widened flow of sinter material passes through the device 24 for aligning the direction of movement of the flow of sinter material before it passes through the segregation device 25.

The main horizontal components of the direction of movements of particles of the sinter material, which after the widening device arrive at the device 24 for aligning the direction of movement of the flow of sinter material, are aligned before the flow of sinter material passes through the segregation device 26. The main horizontal components of the direction of movements of the particles of the flow of sinter material have a substantially parallel alignment after passing through the alignment device, because they all move downwards over the sloping plate thereof towards the wall X.

FIG. 7, which is a more diagrammatic version of FIG. 6, largely corresponds to FIG. 6, although the modules 23a and 23b are shaped and arranged slightly differently, and the device 24 for aligning the direction of movement of the flow of sinter material is arranged differently with respect to the modules 23a and 23b.

Figure 8:
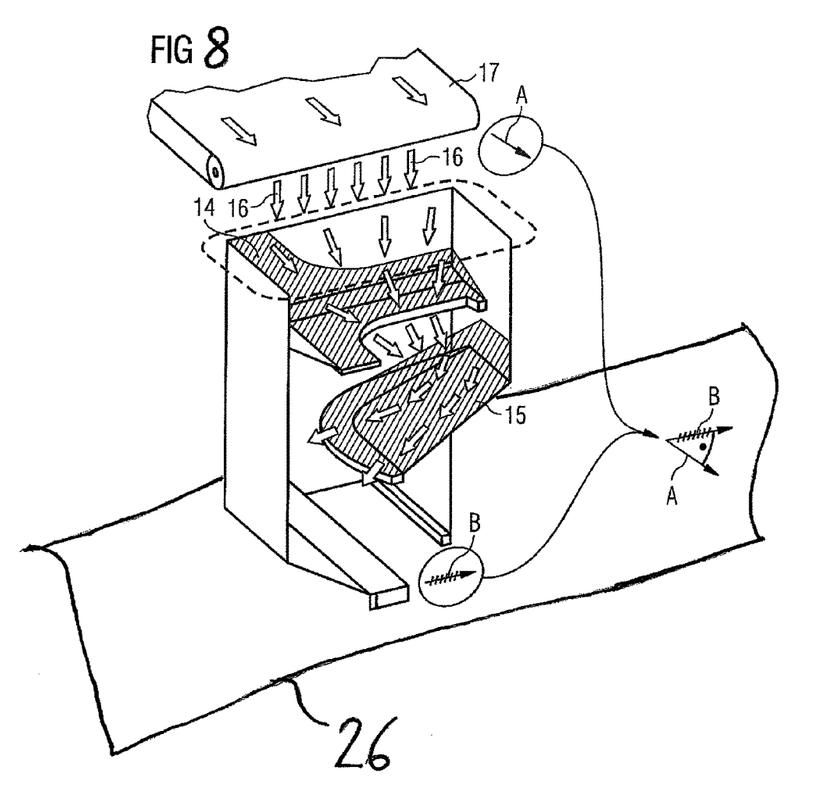
FIG. 8 shows a system according to the invention in a similar view to FIG. 2.

FIG. 8 shows schematically in a similar view to FIG. 2, a system according to the invention, which comprises a sinter belt 17 and a sinter cooler 26. The longitudinal direction of the sinter belt 17, represented by the arrow A, is substantially orthogonal to the direction of movement of the sinter cooler 26 below the output region 5, represented by the arrow B.

LIST OF REFERENCE SIGNS

1 Supply chute
2a,2b,2c',2c'' Side wall

3 Shaft
4 Input region
5 Output region
6 First support
7 Second support
8 Segregation device
9 Portion (of the second support)
10 Portion (of the second support)
11 Portion (of the first support)
12 Portion (of the first support)
13 Portion (of the first support)
14 Cushion of sinter material (on the second support)
15 Cushion of sinter material (on the first support)
16 Flow of sinter material
17 Sinter belt
18 Component
19 Component
20a, 20b Chute modules
21a, 21b Modules of the widening device
22a, 22b Chute modules
23a, 23b Modules of the widening device
24 Device for aligning the direction of movement of the flow of sinter material
25 Segregation device
26 Sinter cooler

LIST OF CITED LITERATURE

Patent Literature

WO 2006/015680A1
WO 1998/052850A1
WO2011/023621A1

The invention claimed is:

1. A sinter material supplying apparatus, comprising:
a sinter belt configured to advance sinter material along a direction of movement having a first main horizontal component toward an input region;
a supply chute configured for passage of sinter material therethrough, the chute having the input region to which the sinter belt delivers the sinter material;
the supply chute comprising a shaft through which the sinter material passes from the input region of the shaft, the chute having an output region from the shaft for the sinter material, the chute being defined by a plurality of sidewalls;
in the shaft of the supply chute, between the input region and the output region, the shaft including a sinter material concentrating device configured for concentrating and therefore remixing the flow of the sinter material from the input region past the concentrating device into a flow of the sinter material that is remixed to reverse an uneven particle grain size distribution different from the particle grain size distribution of the flow of the sinter material prior to the concentrating device;
the concentrating device comprising a first support supported in the shaft of the supply chute at a first orientation of the first support for retaining a first cushion of the sinter material on the first support during the concentrating of the flow of sinter material past the concentrating device;
the concentrating device being followed in the chute by a widening device which comprises a second support supported in the shaft at a second orientation of the second support for retaining a second cushion of the sinter material on the second support during the widening of the flow of the sinter material past the widening device, wherein the widening is positioned and configured to convey the sinter material to enter the output region,
wherein a top portion of the widening device is supported by a sidewall of the plurality of sidewalls;
a segregating device configured thereafter, and positioned to segregate the flow of sinter material so as to urge a particle grain size distribution across the thickness of flow of the sinter material from top to bottom that is substantially uniform across the width of the flow for passing through the output region; and
the output region following the segregating device;
following the output region from the chute, the system being configured such that the direction of movement of the sinter material past the output region is in a second direction of movement that is substantially orthogonal to the first main horizontal component.

2. The apparatus as claimed in claim 1, further comprising:
a sinter cooler at the output region positioned for receiving the sinter material from the chute and for cooling the sinter material.

3. The apparatus as claimed in claim 2, wherein the sinter cooler is configured to additionally move the sinter material in the direction of movement having a main horizontal component in the second direction.

4. The apparatus as claimed in claim 3, wherein the sinter cooler comprises a belt configured to receive the sinter material at the output region, and
the belt moves in the second direction of movement as a principal horizontal component.

5. A supply chute for supplying a sinter material between an input region of the chute and an output region of the chute below the input region, the chute comprising:
an upper end and the input region is at the upper end;
a hollow shaft positioned below the upper end and having an interior;
a lower end, and the output region is at the lower end of the shaft;
a plurality of sidewalls, the sidewalls bounding the shaft and extending between the input region and the output region;
a concentrating device supported in the shaft interior below the input region, the concentrating device being configured for concentrating the flow of sinter material passing the concentrating device to a narrower flow;
a widening device supported in the shaft interior, the widening device positioned following the concentrating device in the shaft and configured for widening the flow of sinter material passing the widening device to a wider flow,
wherein a top portion of the widening device is supported by a sidewall of the plurality of sidewalls;
a segregating device supported in the shaft interior following the widening device and configured for segregating the flow of sinter material toward the output region;
the shaft of the supply chute being comprised of at least two chute modules arranged in succession one above the other defining a vertical orientation of the shaft; and
at least one of the chute modules is movable laterally with respect to the other.

6. The supply chute as claimed in claim 5, wherein the widening device comprises at least two widening device modules defining a vertical orientation of the shaft, such a first widening device is arranged above a second widening device, wherein the first widening device module is connected to and is moved jointly with a higher-lying one of the chute modules.

7. The supply chute of claim 6, wherein the first widening device module has a lower edge comprising an edge barrier configured for supporting a cushion of sinter material behind the edge barrier.

8. The supply chute of claim 5, wherein the concentrating device is comprised of components which extend from at least one of the sidewalls of the shaft to inside the shaft; and at least a portion of the concentrating device having a surface facing the input region to the chute, and the surface has a slope which is greater than an angle of repose of the sinter material, such that some of the sinter material forms a cushion of the sinter material on the surface.

9. The supply chute of claim 5, wherein the widening device comprises at least one component which extends from at least one of the sidewalls of the shaft to the inside of the shaft;

at least a portion of the widening device having a second surface facing the input region to the chute has a slope which is greater than an angle of repose of the sinter material such that some of the sinter material forms a cushion of the sinter material on the second surface.

10. The supply chute as claimed in claim 5, further comprising an aligning device configured to align the direction of movement of flow of the sinter material, and located after the widening device in a flow of sinter material through the chute.

11. The supply chute as claimed in claim 10, wherein the aligning device is a downward sloping plate.

12. The supply chute as claimed in claim 10, wherein the aligning device is located after the widening device and before the segregating device and the output.

13. A supply chute for supplying a sinter material between an input region of the chute and an output region of the chute below the input region, the chute comprising:

an upper end, and the input region is at the upper end;

a hollow shaft below the upper end;

an output region at a lower end of the shaft the shaft; and a plurality of sidewalls bounding the shaft and extending between the input region and the output region;

a first support in the shaft positioned to receive sinter material from the input region and configured to support a cushion of the sinter material lying on the first support; and a second support in the shaft below the first support and configured for supporting a cushion of the sinter material lying on the second support, wherein a top portion of the second support is supported by a sidewall of the plurality of sidewalls;

a segregating device below the second support in the path of the sinter material in the shaft and configured for segregating a flow of the sinter material into a plurality of flows thereof toward the output region;

the shaft of the supply chute is comprised of at least two chute modules arranged in succession one above the other defining a vertical orientation of the shaft; and at least one of the chute modules is movable laterally with respect to the other.

14. The supply chute as claimed in claim 13, wherein the segregating device comprises a downward sloping base plate over which the sinter material flows; and the output region of a supply chute lies between a lower end of the downward sloping base plate and a lower end of the downward sloping base plate and a lower end of at least one of the sidewalls, such that the sinter material exits the output region between both of the lower ends.

15. The supply chute of claim 14, wherein the first support is comprised of at least one component which extends inside the shaft from one or more of the sidewalls of the shaft; and the first support includes a surface facing the input region of the chute and at least a portion of the surface of the first support has a slope that is less than an angle of repose of the sinter material.

16. The supply chute of claim 13, wherein the second support is comprised of at least one component which extends from at least one of the sidewalls of the shaft and into the inside of the shaft; and the second support includes a surface having at least a portion thereof facing the input region of the chute and a having a slope that is less than an angle of repose of the sinter material.

17. The supply chute ad claimed in claim 13, wherein at least one of the first and the second supports has an edge barrier positioned and configured for stabilizing a cushion of sinter material lying on at least one of the first and the second supports.

18. The supply chute as claimed in claim 13, wherein the second support is comprised of a widening device that includes the shaft of the supply chute being comprised of at least two chute modules defining a vertical orientation of the shaft with a first chute module of the two chute modules positioned above a second chute module.

19. The supply chute as claimed in claim 18, wherein the first chute module has a lower edge thereof and an edge barrier thereon configured for supporting a cushion of sinter material at the lower edge barrier.

20. The supply chute of claim 13, further comprising an aligning device configured to align the direction of movement of the flow of sinter material, wherein the aligning device comprises a downwardly sloping plate.

* * * * *

UNITED STATES PATENT AND TRADEMARK OFFICE
CERTIFICATE OF CORRECTION

PATENT NO. : 10,126,055 B2
APPLICATION NO. : 14/772824
DATED : November 13, 2018
INVENTOR(S) : Boeberl et al.

It is certified that error appears in the above-identified patent and that said Letters Patent is hereby corrected as shown below:

On the Title Page

Inventors (72) location should read as follows:
(72) Inventors: Michaela Boeberl, St. Florian (AT);
              Edmund Fehringer, Aschbach Markt (AT);
              Stephan Hattinger, Leonding (AT);
              Stefan List, Linz (AT)

Signed and Sealed this
First Day of January, 2019

Andrei Iancu
*Director of the United States Patent and Trademark Office*